United States Patent
Yoshihara et al.

(10) Patent No.: US 8,617,503 B2
(45) Date of Patent: Dec. 31, 2013

(54) PROCESS FOR PRODUCTION OF SPHEROIDIZED BORON NITRIDE

(75) Inventors: Shusuke Yoshihara, Settsu (JP); Kazuaki Matsumoto, Settsu (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 13/390,558

(22) PCT Filed: Aug. 10, 2010

(86) PCT No.: PCT/JP2010/005014
§ 371 (c)(1),
(2), (4) Date: Feb. 15, 2012

(87) PCT Pub. No.: WO2011/021366
PCT Pub. Date: Feb. 24, 2011

(65) Prior Publication Data
US 2012/0141348 A1 Jun. 7, 2012

(30) Foreign Application Priority Data
Aug. 20, 2009 (JP) .................. 2009-191292

(51) Int. Cl.
*C01B 21/064* (2006.01)
*C01B 35/02* (2006.01)
*B32B 5/16* (2006.01)
*B32B 9/00* (2006.01)

(52) U.S. Cl.
USPC ........... 423/290; 423/289; 977/891; 977/773; 977/775; 428/402; 428/403

(58) Field of Classification Search
None
See application file for complete search history.

(56) References Cited

U.S. PATENT DOCUMENTS

| 3,469,941 | A | * | 9/1969 | Kuhn | 423/290 |
| 3,617,350 | A | * | 11/1971 | Kuchek | 427/242 |
| 5,854,155 | A | | 12/1998 | Kawasaki et al. | |
| 6,096,671 | A | | 8/2000 | Kawasaki et al. | |
| 6,306,358 | B1 | * | 10/2001 | Yamamoto | 423/290 |
| 6,348,179 | B1 | | 2/2002 | Paine et al. | |

(Continued)

FOREIGN PATENT DOCUMENTS

| JP | 60-155507 A | 8/1985 |
| JP | 61-117107 A | 6/1986 |

(Continued)

OTHER PUBLICATIONS

Wei-Qiang Han et al., "Activated Boron Nitride Derived from Activated Carbon," Nano Letters, 2004, vol. 4, No. 1, pp. 173-176 and a cover page.
International Search Report dated Oct. 12, 2010, issued for PCT/JP2010/005014.

*Primary Examiner* — Guinever Gregorio
(74) *Attorney, Agent, or Firm* — Edwards Wildman Palmer LLP; James E. Armstrong, IV

(57) ABSTRACT

Disclosed is a process for producing spheroidized boron nitride which enable the further improvement in the heat conductivity of a heat dissipative member. Specifically disclosed is a process for producing spheroidized boron nitride, which is characterized by using spheroidized graphite as a raw material and reacting the spheroidized graphite with a boron oxide and nitrogen at a high temperature ranging from 1600 to 2100° C. to produce the spheroidized boron nitride. The boron oxide to be used in the reaction is preferably boron oxide ($B_2O_3$), boric acid ($H_3BO_3$), or a substance capable of generating a boron oxide at a higher temperature. A gas to be used in the reaction is preferably nitrogen or ammonia.

5 Claims, 3 Drawing Sheets

(56) References Cited

U.S. PATENT DOCUMENTS

| | | | |
|---|---|---|---|
| 6,652,822 B2 * | 11/2003 | Phillips et al. | 423/290 |
| 7,244,406 B2 * | 7/2007 | Ohtsubo | 423/290 |
| 7,976,941 B2 * | 7/2011 | Lodyga et al. | 428/325 |
| 2012/0058342 A1 * | 3/2012 | Lodyga et al. | 428/403 |

FOREIGN PATENT DOCUMENTS

| | | |
|---|---|---|
| JP | 09-202663 A | 8/1997 |
| JP | 2000-109306 A | 4/2000 |
| JP | 2000-327312 A | 11/2000 |
| JP | 2001-294409 A | 10/2001 |

* cited by examiner

Particle size (μm)

PROCESS FOR PRODUCTION OF SPHEROIDIZED BORON NITRIDE

TECHNICAL FIELD

The present invention relates to a process for production of spheroidized boron nitride.

BACKGROUND ART

Particles of hexagonal boron nitride (hereinafter referred to as "hBN") have a layer structure similar to that of graphite and have excellent characteristics such as high heat conductivity, electrically insulating properties, chemical stability, solid lubricity, and thermal shock resistance.

By taking advantages of these characteristics, an electronic materials field employs a heat dissipative member incorporated with the hBN powder in a resin or rubber, such as a heat dissipative grease, a flexible spacer, and a heat dissipative sheet, in order to efficiently disperse heat generated from an electronic component.

A common hBN powder is an aggregate of scaly particles and when the hBN powder is incorporated in a resin or rubber, the particles are aligned in the same direction to be oriented (see JP-A No. 9-202663). The hBN particles have a thermal conductivity of 400 W/mK in a surface direction (a-axis direction) but have a thermal conductivity of 2 W/mK in a thickness direction (c-axis direction), which suggests anisotropic thermal conductivity. Thus, for example, when the hBN particles are oriented in a heat dissipative sheet, the hBN particles are incorporated while a surface direction (a-axis direction) of the particles is in parallel with a surface direction of the sheet, and hence the sheet is unlikely to obtain an improved thermal conductivity in the thickness direction.

In order to solve such a problem, an hBN powder that is unlikely to be oriented even when it is incorporated in an insulating heat dissipative sheet and that has a shape except the scaly shape has been intended to be used. Examples of such an hBN powder include a bulk of boron nitride containing an undeveloped crystal (see JP-A No. 61-117107), an hBN powder granulated by spray drying or the like (see U.S. Pat. No. 6,348,179), and an hBN powder produced by pulverization of a sintered hBN (see JP-A No. 9-202663).

However, the bulk of hBN containing an undeveloped crystal is inferior in characteristics such as purity and heat conductivity to the scaly hBN powder, and hence the insulating heat dissipative sheet does not have improved thermal conductivity in the thickness direction and also has reduced moisture resistance reliability. The hBN powder granulated by spray drying or the like has a particle size of about 10 μm or less and a spheroidized boron nitride having a large particle size is difficult to be synthesized. The powder produced by pulverization of a sintered hBN has some advantages compared to conventional powders because the hBN particles are oriented during hot press or preformimg in a production process of the sintered hBN to increase the ratio of particles in which the oriented primary particles are aggregated. However, the hBN particles are still incorporated while the a-axis direction is in parallel with the surface direction of the insulating heat dissipative sheet. Moreover, the powder requires high cost.

Meanwhile, for a reduction nitridation method for synthesizing hBN from an oxide of boron and carbon as raw materials under a nitrogen atmosphere, there are disclosed a method for synthesizing scaly boron nitride (see JP-A No. 60-155507), a method for synthesizing boron nitride nanotube (see JP-A No. 2000-109306), and a method for synthesizing hBN having a large surface area (see Non-Patent Document: Nano Letters, 2004, 4 (1), 173-176). However, there is no description about a synthesis of spheroidized boron nitride.

CITATION LIST

Patent Literature

Patent Document 1: JP-A No. 9-202663
Patent Document 2: JP-A No. 61-117107
Patent Document 3: U.S. Pat. No. 6,348,179
Patent Document 4: JP-A No. 60-155507
Patent Document 5: JP-A No. 2000-109306
Non-Patent Document 1: Nano Letters, 2004, 4 (1), 173-176

SUMMARY OF INVENTION

Technical Problem

It is an object of the present invention to provide a simple process for production of spheroidized boron nitride.

Solution to Problem

In order to solve the problems, the present inventors have found that spheroidized graphite is used as a starting material and is chemically reacted with an oxide of boron and nitrogen at a high temperature and thus the spheroidized graphite can be transformed into boron nitride while maintaining the original shape to produce spheroidized boron nitride, and as a result, the invention has been completed.

Namely, the present invention includes the items 1) to 3) below.

1) A process for producing spheroidized boron nitride is characterized by using spheroidized graphite as a raw material and reacting the spheroidized graphite with an oxide of boron and nitrogen at a high temperature ranging from 1600° C. to 2100° C. to produce spheroidized boron nitride.

2) In the process for producing spheroidized boron nitride according to the item 1), the oxide of boron used for the reaction is boron oxide ($B_2O_3$), boric acid ($H_3BO_3$), or a substance generating the oxide of boron at a high temperature and a gas used for the reaction is nitrogen or ammonia.

3) In the process for producing spheroidized boron nitride according to the items 1) or 2), a boron oxide powder and the spheroidized graphite are placed together in a crucible or separately placed in crucibles, the crucible(s) is placed in a furnace, and a nitrogen gas flows to be in contact with the boron oxide powder and the spheroidized graphite while heating.

Advantageous Effects of Invention

According to the process for producing spheroidized boron nitride of the present invention, spheroidized graphite is transformed into boron nitride while maintaining the shape of the spheroidized graphite as the raw material, and therefore spheroidized boron nitride can be simply synthesized.

DESCRIPTION OF EMBODIMENTS

Figure 1:
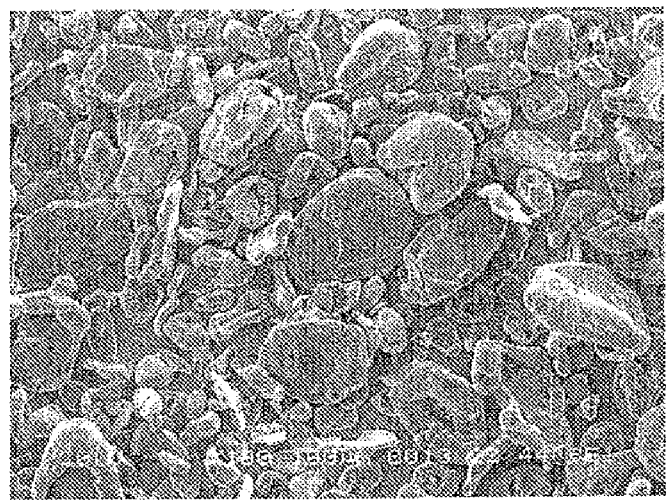
FIG. 1 is an electron micrograph of spheroidized graphite (CGC100 manufactured by Nippon Graphite Industries, Ltd.).

The process for producing spheroidized boron nitride of the present invention is characterized by using spheroidized graphite as a raw material and reacting the spheroidized graphite with an oxide of boron and nitrogen at a high temperature ranging from 1600° C. to 2100° C. to produce the spheroidized boron nitride.

The spheroidized graphite is spherical particles and a graphite powder having suppressed orientation. The spheroidized graphite of the present invention is a graphite powder that is recognized as "spheroidized graphite" by persons skilled in the art or graphite makers.

The spheroidized boron nitride of the present invention is a laminated and/or aggregated hBN powder having a shape that is recognized as spherical by persons skilled in the art.

The "spherical" shape in the present invention can be determined by, for example, "sphericity" described below in addition to the recognition by persons skilled in the art. Each sphericity of graphite and boron nitride in the present invention can be obtained from the ratio (DS/DL) of largest particle diameter (DL) and small particle diameter (DS) orthogonal to the largest particle diameter when viewed from at least one direction. Such a sphericity is determined as follows: firstly, an electron micrograph of particles is taken to confirm that there are no non-spherical particles; then, each small particle diameter (DS) and largest particle diameter (DL) of arbitrary ten particles is determined; and the mean value of the ratios (DS/DL) is calculated to determine the sphericity. In order to reduce the anisotropy of heat conductivity, each sphericity of graphite and boron nitride is preferably 0.5 to 1.0 when viewed from at least one direction.

The process for producing spheroidized boron nitride of the present invention is characterized by using spheroidized graphite as a raw material. For example, when a carbon black that is spheroidized in the form of beads is used, a scaly hBN alone is formed as a product and such a carbon black cannot be transformed into boron nitride maintaining the spherical shape because the carbon black is not crystallized as graphite.

In each method for producing boron nitride described in Patent Document 5 and Non-Patent Document 1, the used carbon material is carbon nanotube or activated carbon each having a large surface area, and thus an oxide of boron can be readily in contact with the carbon element to be reacted. In contrast, as the spheroidized graphite has a larger particle size, it has a smaller surface area. Hence, it is an unexpected finding that the spheroidized graphite can be sufficiently boron nitrided by the method in which an oxide of boron is in contact with the carbon element to undergo the reaction. It is also an unexpected finding that the boron nitride obtained in this manner maintains the spherical aggregation state having substantially the same particle size.

For the mixing of the oxide of boron and the spheroidized graphite as the raw materials, both materials may be mixed or blended with each other using an appropriate apparatus such as a ball mill, a ribbon blender, and a Henschel Mixer in a dry condition.

After the mixing/blending process, the mixture is dried at an arbitrary temperature ranging from 150 to 250° C. The drying operation may be carried out in air or in a nitrogen or ammonia atmosphere.

The drying time depends on the drying temperature as well as whether the drying process is carried out in a static condition or in a circulating air or a gas stream.

For the arrangement of the oxide of boron and the spheroidized graphite as the raw materials, the spheroidized graphite may be stacked on the oxide of boron to form a layer. The arrangement is arbitrary as long as the oxide of boron (such as $B_2O_3$ and $B_2O_2$) can reach onto the spheroidized graphite by diffusion or transportation. The raw materials may be placed in non-contact with each other. As the oxide of boron, other substances generating the oxide of boron by heat may be used. Examples of the substance include boric acid, boron oxide, organic boric acid compounds such as melamine borate, solids and liquids of substances such as a mixture of boric acid and an organic compound, and gases containing boron or oxygen. Such a substance does not need to be held in a crucible in a fixed state but may pass while flowing in contact with the spheroidized graphite.

The nitrogen source may be a neutral or reducing gas containing nitrogen, and a gas such as nitrogen and ammonia can be conveniently used without treatment or as a mixture or diluted gas. A nitrogen gas is most preferred because it is inexpensive and safe.

Any crucible may be used as long as it is not reacted with the raw materials to cause no troubles. A graphite crucible is preferred because it is inexpensive and readily processed. A BN crucible is also excellent in processability and corrosion resistance.

For the heating condition, for example, $B_2O_3$ is heated at 1500° C. for 30 minutes in a nitrogen stream to be transformed into an oxide of boron (such as $B_2O_2$). Then, the oxide of boron is vaporized or surface-dispersed to reach to the spheroidized graphite and is reduced by the graphite carbon and simultaneously reacted with nitrogen to form BN. The reaction affords spheroidized boron nitride in the crucible while maintaining the shape of spheroidized graphite as the raw material. The maintaining of the spheroidized graphite shape can be ascertained by, for example, SEM observation.

The spheroidized boron nitride obtained by the process of the present invention has substantially the same average particle size as that of the spheroidized graphite as the starting material and has substantially the same particle size distribution as that of the spheroidized graphite. The average particle size and the particle size distribution can be ascertained by Microtrac measurement.

In the process of the present invention, the formation of the spheroidized boron nitride needs 1600° C. or more. The lower limit of the heating temperature is preferably 1700° C. or more and more preferably 1800° C. or more.

BN is decomposed at an excessively high temperature. Hence, the upper limit is 2100° C. or less and is preferably 2000° C. or less. When boron oxide is used in contact with the spheroidized graphite, the heating temperature is most preferably set at 1600° C. to 2000° C. because the oxide of boron has a too high evaporation speed and a too high reaction speed at a high temperature and thus the spheroidized graphite is dispersed from a crucible.

The baking furnace to be used is exemplified by batch furnaces such as a muffle furnace, a tubular furnace, and an atmosphere furnace and continuous furnaces such as a rotary kiln, a screw conveyor furnace, a tunnel furnace, a belt furnace, a pressure furnace, and a vertical continuous furnace. These baking furnaces are selected to be used for an intended purpose. For example, a batch furnace is used when many kinds of spheroidized boron nitrides are produced in small amounts, while a continuous furnace is used when a certain spheroidized boron nitride is produced in a large amount.

The spheroidized boron nitride produced as described above is subjected, as necessary, to after treatments such as classification, washing, and drying and then is used in practice.

The spheroidized boron nitride of the present invention is characterized by particles of spherically aggregated hBN. The aggregation of hBN can be ascertained by XRD diffraction peaks.

EXAMPLES

Figure 2:
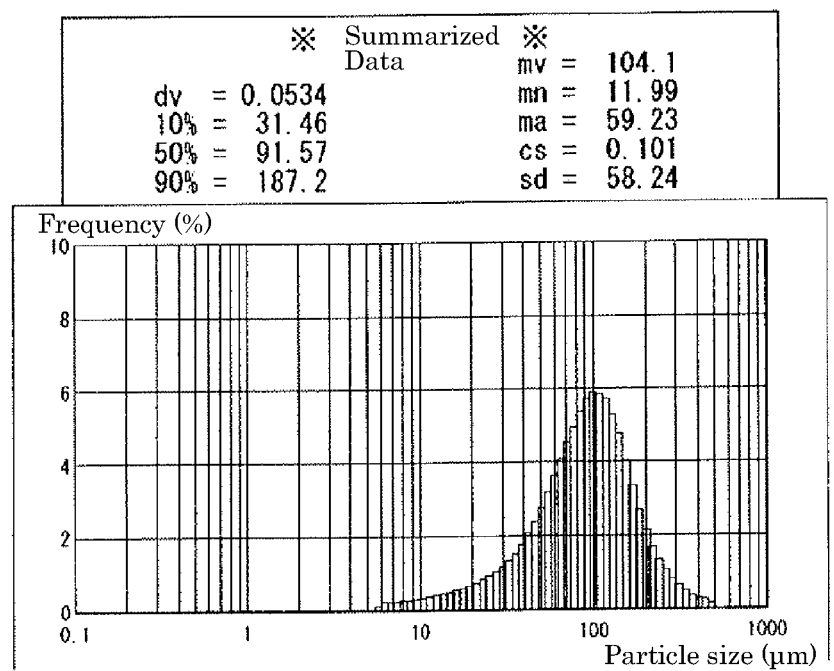
FIG. 2 is a particle size distribution diagram of the spheroidized graphite (CGC100 manufactured by Nippon Graphite Industries, Ltd.).

Hereinafter, the process for producing spheroidized boron nitride will be described in further detail with reference to examples, but the present invention is not intended to be limited to the examples. The spheroidized graphite used was CGC100 manufactured by Nippon Graphite Industries, Ltd. (an average particle size of 90 μm). An electron micrograph at a magnification of 100 times is shown in FIG. 1 and a particle size distribution diagram is shown in FIG. 2. The sphericity was calculated as 0.79 from the electron micrograph. Other used reagents described below were manufactured by Wako Pure Chemical Industries, Ltd. unless otherwise specified.

Average Particle Size Evaluation:

Into a 100-ml beaker, 15 ml of 20% by weight aqueous sodium hexametaphosphate (extra pure reagent) solution was placed. To the aqueous solution, 60 mg of a particle sample was added and dispersed for 40 minutes with an ultrasonic dispersion apparatus. The dispersed sample was placed in a chamber of a laser scattering particle size analyzer (MICROTRAC HRA [NIKKISO CO., LTD.] 9320-X100) to determine a volume distribution in a measurement range of 0.1 to 1000 μm and at a measurement time of 120 seconds. The particle size at a volume distribution of 50% was determined as the average particle size.

XRD Measurement:

A powder X-ray diffractometer (PANalytical X'Pert PRO [Spectris Co., Ltd.]) was used for measurement in a condition shown in Table 1 to identify hBN.

Example 1

Figure 3:
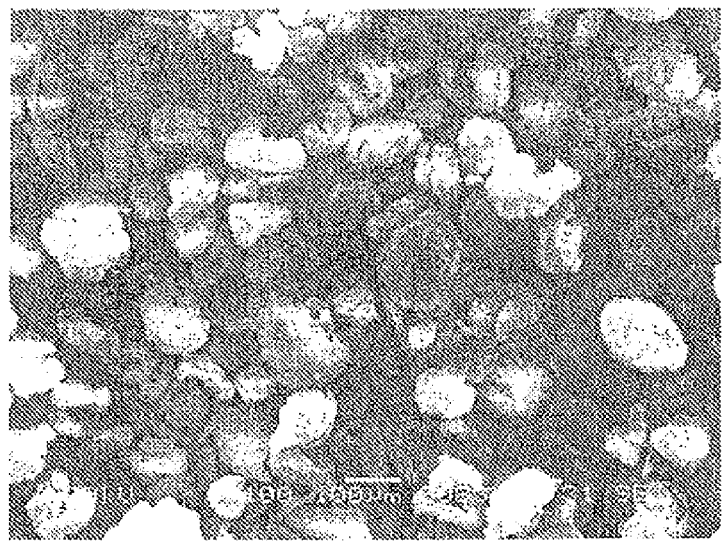
FIG. 3 is an electron micrograph of spheroidized boron nitride obtained in Example 1.
Figure 4:
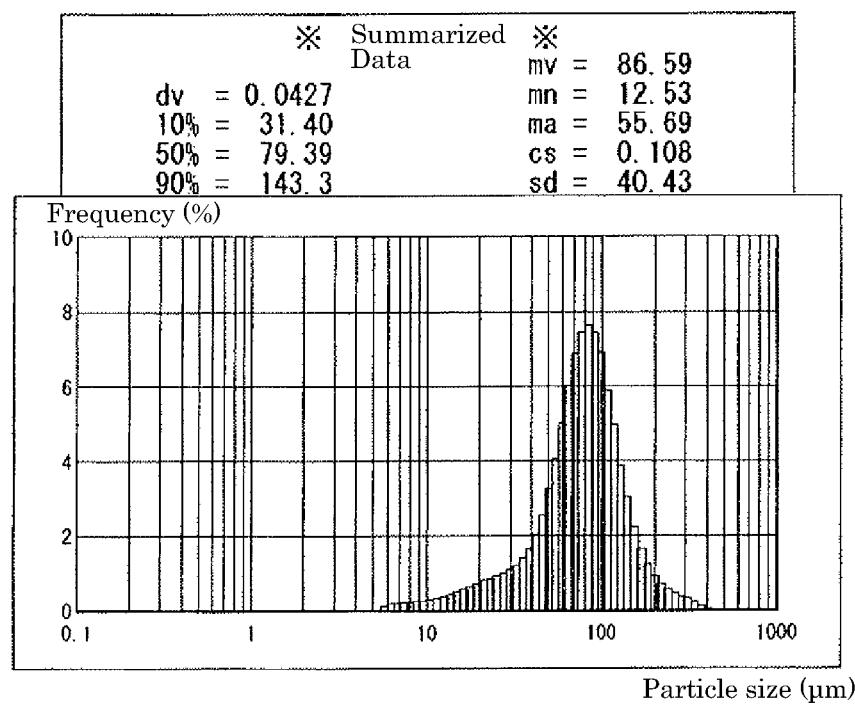
FIG. 4 is a particle size distribution diagram of the spheroidized boron nitride obtained in Example 1.
Figure 5:
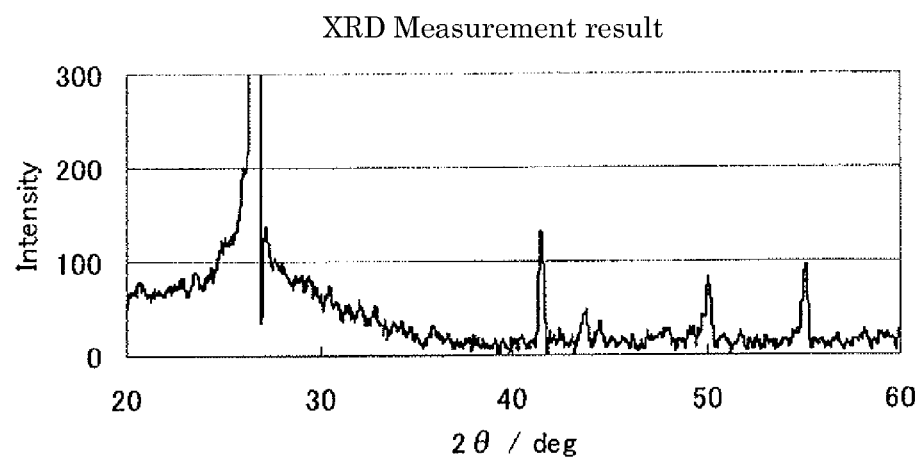
FIG. 5 is an XRD diffraction peak profile of the spheroidized boron nitride obtained in Example 1.

With a Henschel Mixer, 100 parts by weight of boron oxide and 50 parts by weight of spheroidized graphite [CGC100 (an average particle size of 90 μm) manufactured by Nippon Graphite Industries, Ltd.] were mixed. Then, the mixture was placed in a graphite crucible, heated under a nitrogen atmosphere at a temperature increase rate of 10° C./minute to 1800° C., and baked at 1800° C. for 1 hour. The obtained baked product was washed with 1N aqueous nitric acid solution. The obtained spheroidized boron nitride had an average particle size of 79 μm and had substantially the same shape as that of the spheroidized graphite as the raw material. An electron micrograph at a magnification of 100 times is shown in FIG. 3 and a particle size distribution diagram is shown in FIG. 4. The sphericity was calculated as 0.78 from the electron micrograph. The XRD diffraction peak profile is shown in FIG. 5 and shows the diffraction peaks for the lattice planes 002, 100, 101, 102, and 104, and therefore the hBN peaks could be determined.

Example 2

Figure 6:
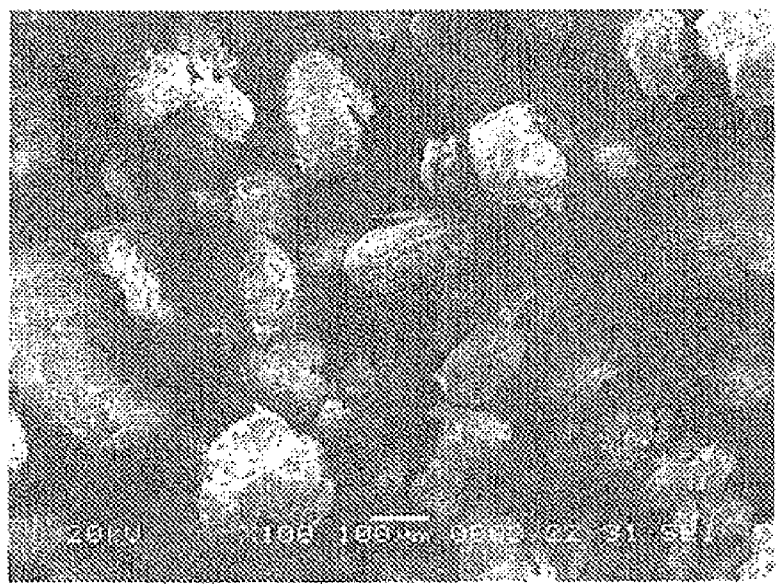
FIG. 6 is an electron micrograph of spheroidized boron nitride obtained in Example 2.

Spheroidized boron nitride was obtained in the same manner as in Example 1 except that boric acid was used in place of boron oxide and that 25 parts by weight of spheroidized graphite (CGC100 (an average particle size of 90 μm) manufactured by Nippon Graphite Industries, Ltd.) was used with respect to 100 parts by weight of boric acid. The obtained spheroidized boron nitride had an average particle size of 78 μm, which is substantially the same as that of the spheroidized boron nitride in Example 1, and had substantially the same shape as that of the spheroidized graphite as the raw material. An electron micrograph at a magnification of 100 times is shown in FIG. 6. The sphericity was calculated as 0.80 from the electron micrograph. XRD identified hBN.

Comparative Example 1 hBN was synthesized in the same manner as in Example 1 except that carbon black (SEAST 3 (an average bead diameter of about 1 mm) manufactured by TOKAI CARBON CO., LTD.) was used in place of spheroidized graphite. The hBN obtained was not spherically aggregated and was scaly hBN particles.

TABLE 1

| Detector | X'Celerator (semiconductor array detector) | | |
|---|---|---|---|
| X ray used | Cu—Kα ray | Scan speed | 1.11°/sec |
| Filter | Ni filter | Sampling interval | 0.017° |
| X-ray intensity | 45 kV · 40 mA | Divergence slit | Automatic |
| Angle range | 2θ = 3 to 90° | Antiscatter slit | 1° |

According to the present invention, spheroidized boron nitride that can further improve the heat conductivity of a heat dissipative member can be readily produced.

The invention claimed is:

1. A process for producing spheroidized boron nitride, the process comprising:
    using spheroidized graphite as a raw material; and
    reacting the spheroidized graphite with an oxide of boron and nitrogen at a high temperature ranging from 1600° C. to 2100° C. to produce spheroidized boron nitride which is a laminated and/or aggregated hexagonal boron nitride (hBN) powder having a spherical shape.

2. The process for producing spheroidized boron nitride according to claim 1, wherein the oxide of boron used for the reaction is boron oxide ($B_2O_3$), boric acid ($H_3BO_3$), or a substance generating the oxide of boron at a high temperature and a gas used for the reaction is nitrogen or ammonia.

3. The process for producing spheroidized boron nitride according to claim 2, wherein a boron oxide powder and the spheroidized graphite are placed together in a crucible or separately placed in crucibles, the crucible(s) is placed in a furnace, and a nitrogen gas flows to be in contact with the boron oxide powder and the spheroidized graphite while heating.

4. The process for producing spheroidized boron nitride according to claim 1, wherein a boron oxide powder and the spheroidized graphite are placed together in a crucible or separately placed in crucibles, the crucible(s) is placed in a furnace, and a nitrogen gas flows to be in contact with the boron oxide powder and the spheroidized graphite while heating.

5. The process for producing spheroidized boron nitride according to claim 1, wherein each sphericity of the spheroidized boron nitride is 0.5 to 1.0.

\* \* \* \* \*